United States Patent
Trump et al.

(10) Patent No.: US 7,921,345 B2
(45) Date of Patent: Apr. 5, 2011

(54) AUTOMATED TEST SYSTEM

(75) Inventors: Craig R. Trump, Cypress, TX (US); Noah H. Smith, College Station, TX (US); Peter D. Rega, Sugar Land, TX (US); Akhil Patel, Bryan, TX (US); Jeffrey Carollo, College Station, TX (US); John R. Morton, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1648 days.

(21) Appl. No.: 11/132,569

(22) Filed: May 19, 2005

(65) Prior Publication Data

US 2006/0265627 A1    Nov. 23, 2006

(51) Int. Cl.
*G01R 31/3187* (2006.01)
*G01R 31/40* (2006.01)

(52) U.S. Cl. .................. 714/733; 714/739

(58) Field of Classification Search .............. None
See application file for complete search history.

(56) References Cited

U.S. PATENT DOCUMENTS

| | | | | |
|---|---|---|---|---|
| 5,027,343 A | * | 6/1991 | Chan et al. | 370/250 |
| 5,107,428 A | * | 4/1992 | Bethencourt et al. | 701/35 |
| 5,257,393 A | * | 10/1993 | Miller | 709/224 |
| 5,572,570 A | * | 11/1996 | Kuenzig | 379/1.02 |
| 5,579,271 A | * | 11/1996 | Sohn et al. | 365/201 |
| 5,630,049 A | * | 5/1997 | Cardoza et al. | 714/25 |
| 5,978,936 A | * | 11/1999 | Chandra et al. | 714/43 |
| 6,163,805 A | * | 12/2000 | Silva et al. | 709/227 |
| 6,581,169 B1 | * | 6/2003 | Chen et al. | 714/47 |
| 6,754,844 B1 | * | 6/2004 | Mitchell | 714/4 |
| 6,799,147 B1 | * | 9/2004 | Balasubramanian et al. | 702/186 |
| 6,959,433 B1 | * | 10/2005 | Morales et al. | 717/127 |
| 7,117,411 B2 | * | 10/2006 | McNeely et al. | 714/724 |
| 2002/0063568 A1 | * | 5/2002 | Hung | 324/753 |
| 2005/0022086 A1 | * | 1/2005 | Kotz et al. | 714/742 |
| 2005/0071580 A1 | * | 3/2005 | LeClerg et al. | 711/154 |
| 2006/0174162 A1 | * | 8/2006 | Varadarajan et al. | 714/38 |

FOREIGN PATENT DOCUMENTS

JP    05107304 A * 4/1993

OTHER PUBLICATIONS

IBM Software—Rational TestManager, 2 pp. [Online] http://www-306.ibm.com/software/awdtools/test/manager/index.html, May 19, 2005.

* cited by examiner

*Primary Examiner* — Robert Beausoliel
*Assistant Examiner* — Dipakkumar Gandhi

(57) ABSTRACT

A system comprising a plurality of components and an automation module coupled to the plurality of components. The automation module is adapted to automatically initialize a software test environment for at least one of the plurality of components, where the software test environment prepares the at least one of the plurality of components to be tested. The automation module also is adapted to, without transferring a testing agent to the at least one of the plurality of components, automatically test the at least one of the plurality of components.

22 Claims, 3 Drawing Sheets

AUTOMATED TEST SYSTEM

BACKGROUND

Software and hardware systems are tested for accuracy, speed, reliability and any of a variety of other factors using test systems. Software and hardware systems subject to such testing are known as "systems under test" (SUT). Manual (i.e., human) assistance is often necessary for a test system to execute testing instructions on a SUT, to monitor the SUT for proper performance, to collect test results, and to perform other such testing functions. Further, testing a SUT often requires transferring testing agents (e.g., executable files, IBM® Rational Agents, HP® Rapid Deployment Pack (RDP) Agents) to the SUT. Because these test systems require extensive manual assistance, and because the use of testing agents is often necessary, the test systems often are undesirably slow, time consuming, prone to error, expensive, difficult to manage and difficult to use on more than one SUT at a time.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Also, the terms "without manual assistance" and "automatically" are intended to describe actions that are performed with minimal or no human intervention. However, the terms "without manual assistance" and "automatically" do not necessarily denote a complete lack of human involvement. Further, a "test application" refers to a tool that tests a system by stressing, validating or modifying the system. A "test agent" refers to a tool that follows instructions (e.g., a script) and executes test applications on a system. Test agents may be used to configure and run test applications. Further still, the term "stress," such as when used to describe the effect of a test application on a system, may mean "affect," "alter," and/or "test."

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
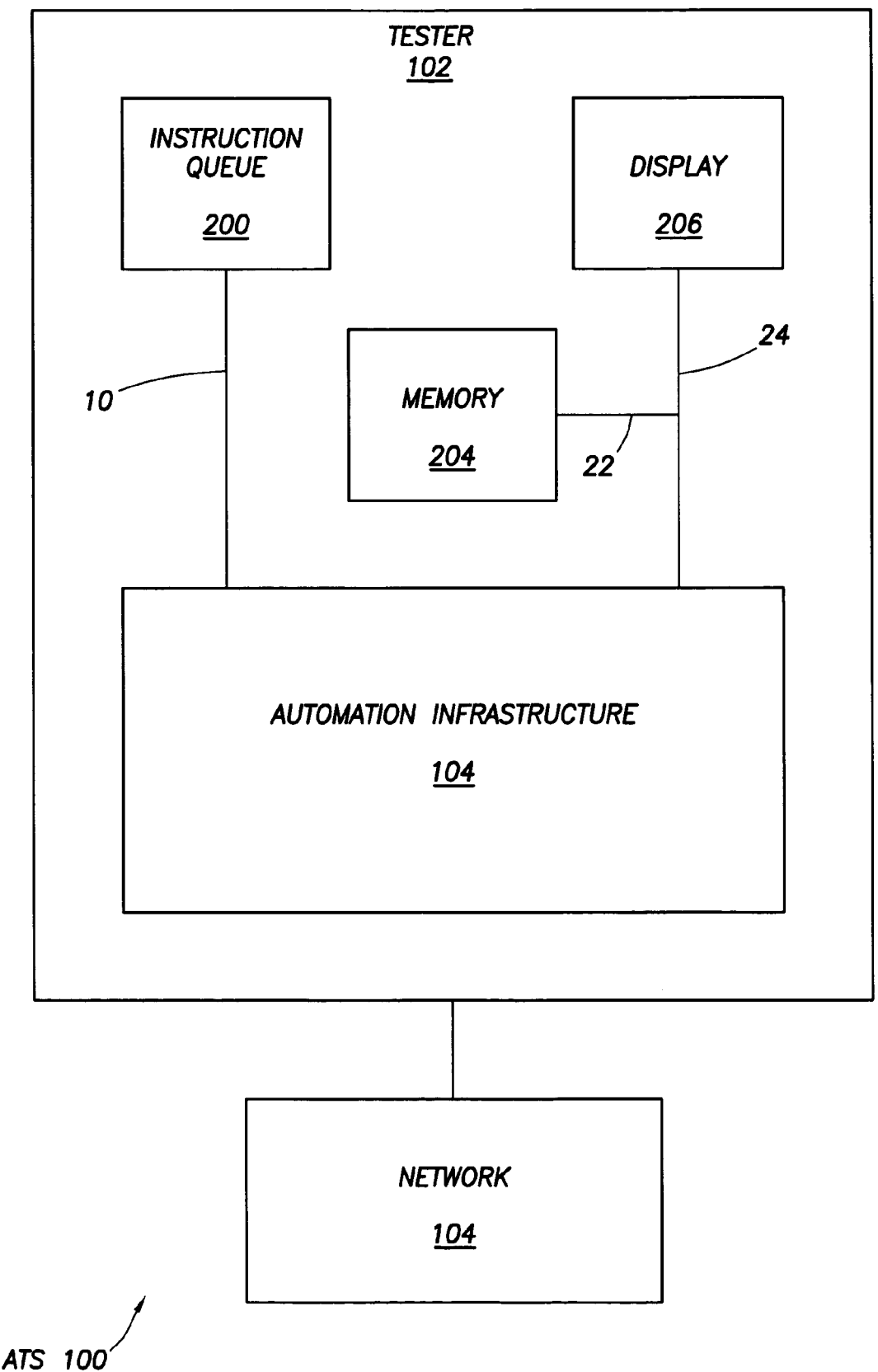
FIG. 1 shows a block diagram of an automated testing system (ATS) comprising a tester coupled to a network of systems under test (SUT), in accordance with embodiments of the invention.

Disclosed herein is an automatic testing system (ATS) that automatically (i.e., with little or no manual intervention) schedules and conducts tests on multiple systems under test (SUT) at a time. The ATS also collects test results and is capable of storing and/or displaying the test results. FIG. 1 shows a block diagram of an illustrative embodiment of the ATS. Specifically, FIG. 1 shows an ATS 100 comprising a network 106 that comprises a plurality of SUTs (shown in FIG. 2). The ATS 100 further comprises a tester 102 that comprises an automation infrastructure 104, an instruction queue 200, a memory 204 and a display 206. The instruction queue 200 may comprise any suitable storage medium (e.g., a cache or a memory), may be of any suitable size and stores a plurality of instructions for testing one or more SUTs. The instruction queue 200 provides test instructions to the automation infrastructure 104 via connection 10.

The automation infrastructure 104, with minimal or no external assistance, receives test instructions from the instruction queue 200, schedules the test instructions, executes the test instructions and collects result data. More specifically, the automation infrastructure 104 translates the instructions into a series of commands and sends the commands to the SUT(s) in the network 106 for which the test instructions are intended. These commands cause SUT(s) to perform various functions that facilitate the testing of one or more aspects of the SUT(s). For example, to test the time it takes to launch a software application, the command may cause the software application to be launched. The same command or a subsequent command may cause the SUT to time the launch. In this way, the automation infrastructure 104 remotely and automatically tests the relevant SUT(s) in the network 106 without actually transferring a software testing agent, such as those previously described, to the relevant SUT(s).

The automation infrastructure 104 comprises a pipeline architecture capable of processing multiple instructions at a time. The automation infrastructure 104 also may process test instructions for multiple SUTs at a time. Results of tests may be gathered from the SUTs by the processing module 214 and transferred from the automation infrastructure 104 to the memory 204 via connection 22 for storage or to the display 206 via connection 24 to be displayed to a user.

Figure 2:
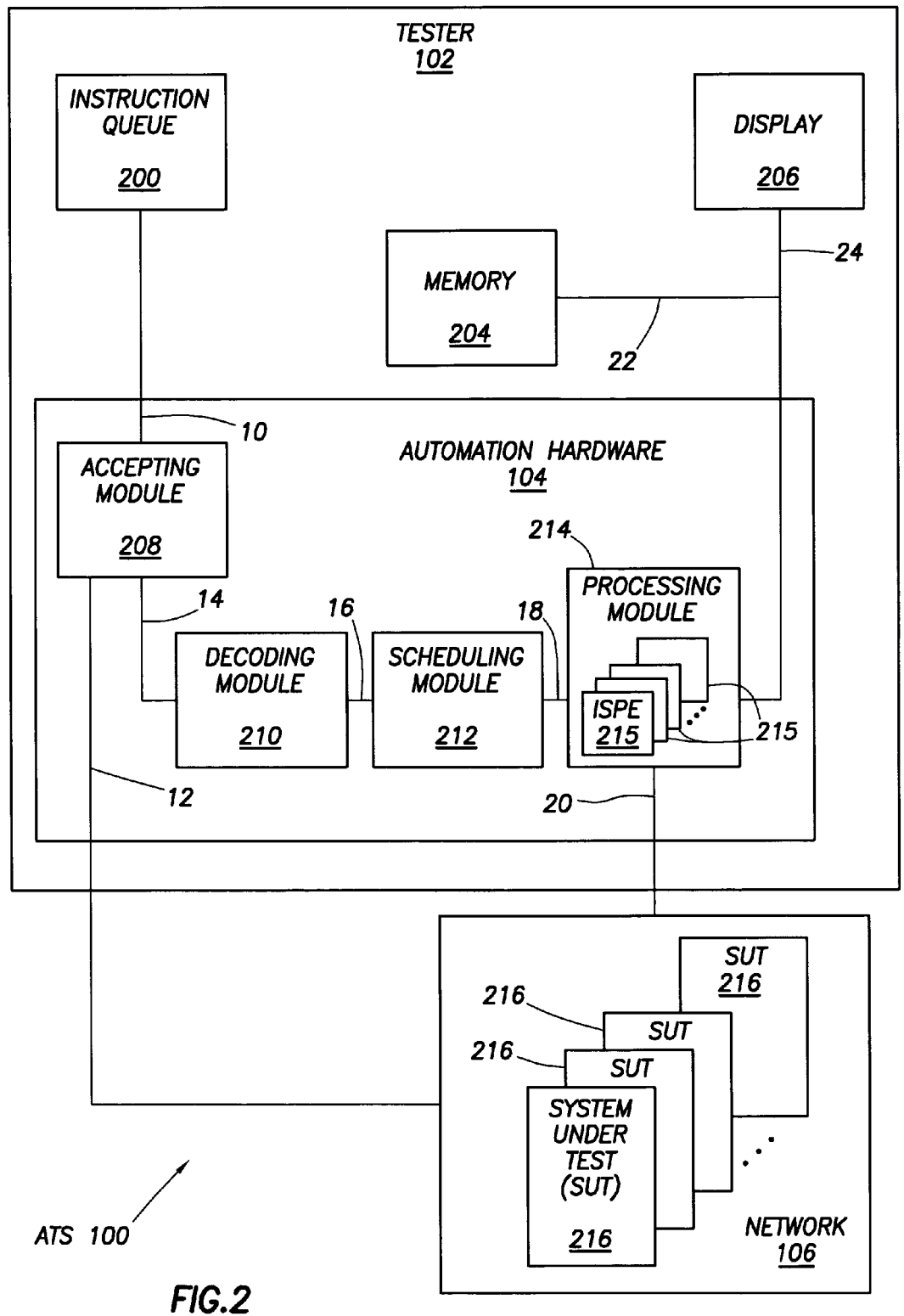
FIG. 2 shows the ATS of FIG. 1 in detail, in accordance with embodiments of the invention.

FIG. 2 shows the ATS 100 of FIG. 1 in detail. The tester 102 comprises the instruction queue 200, the memory 204, the display 206 and the automation infrastructure 104. In the embodiment of FIG. 2, the automation infrastructure 104 comprises multiple software "pipeline" modules, including an accepting module 208, a decoding module 210, a scheduling module 212 and a processing module 214. The modules may be referred to as "pipeline" modules because the automation infrastructure 104 is modeled after a CPU pipeline. The processing module 214 comprises a plurality of instruction-specific processing elements (ISPEs) 215 as described further below. The network 106 comprises a plurality of SUTs 216. The SUTs 216 may be coupled to each other and to the tester 102 using wire connections, a wireless network or any other suitable communications medium. As previously mentioned, a SUT 216 may be any hardware or software system that is to be tested using one or more test instructions from the test instruction storage queue 200. A SUT 216 that is software may be stored in the memory of hardware, such as a computer, which hardware is part of the network 106. Hardware SUTs 216 or hardware containing software SUTs 216 (hereinafter collectively referred to as SUTs 216 for ease of reference) may be physically located in the same or different areas. For example, in some embodiments, some or all SUTs 216 are located in a single room. In other embodiments, some or all of the SUTs 216 are located in separate rooms or even kilometers apart. Examples of SUTs 216 comprise servers, laptop computers, wireless communication devices, operating systems, software applications, etc.

The test instructions stored in the instruction queue 200 may be in a workload definition file (WDF) format, although in other embodiments, other formats may be used. Test instructions may be user-defined (e.g., generated by a programmer) or may be generated by the tester 102. Each test instruction indicates a SUT 216 in the network 106 that is to be tested using the test instruction (i.e., a "target" SUT). For example, a test instruction may indicate that the test instruction is intended to test a first SUT 216 in the network 106. This first SUT 216 is the "target" SUT 216 for that instruction. In some embodiments, the test instruction may have multiple target SUTs 216. In such embodiments, the test instruction may request that one SUT 216 act as a proxy host to manage tests on one or more different SUTs 216. Such a capability is useful in cases where one or more applications running on a target SUT 216 may be unstable or even deleterious to the ATS 100. In this way, the use of a proxy host protects the ATS 100 from damage.

Referring still to FIG. 2, the accepting module 208 accepts test instructions from the instruction queue 200 by way of connection 10. When a new test instruction is received from the instruction queue 200, the accepting module 208 validates the test instruction to ensure that the instruction may be properly processed in the ATS 100. The accepting module 208 validates the instruction by checking, for example, the instruction type (e.g., whether the instruction is a test instruction or some other unsuitable type of instruction) or the target SUT 216 (e.g., whether the target SUT is found in network 106). Such information may be stored, for instance, in a header section of the instruction. In systems comprising multiple automatic testing systems, each ATS's accepting module 208 may evaluate the current workload of its ATS and may, if the ATS is busy or overloaded with work, reject additional work (i.e., instructions). In this manner, multiple ATSs work together to evenly distribute work.

If the instruction is not suitable for the ATS 100 (e.g., the instruction is not a test instruction), then the instruction may be ignored or discarded by the accepting module 208. Alternatively, if the instruction is a proper, valid instruction, then the accepting module 208 determines for which SUT 216 the test instruction is intended (i.e., the target SUT 216). The accepting module 208 then checks by way of connection 12 whether the target SUT 216 is immediately available to be tested, for instance by pinging the target SUT 216 or by checking the memory 204 for the most recent status of the target SUT 216. For example, the target SUT 216 may be undergoing a previously-initiated test at the time the accepting module 208 is processing a new test instruction, in which case the target SUT 216 is not immediately available to the new instruction. In this case, the new test instruction may be placed back into the instruction queue 200 for consideration at a later time. Alternatively, instead of returning the instruction to the instruction queue 200, the accepting module 208 may store the instruction and wait until the target SUT 216 is available. However, if the target SUT 216 is indeed immediately available, then the accepting module 208 transfers the test instruction to the decoding module 210 via connection 14 for further processing.

Because a valid test instruction may be in a format unsuitable for processing by the processing module 214, the decoding module 210 may decode, or "translate," the test instruction into a format suitable for the processing module 214. More specifically, the decoding module 210 receives the test instruction from the accepting module 208 and, using one or more suitable translation files stored in the decoding module 210, generates a test instruction in a format that the processing module 214 is capable of processing. For example, in embodiments where the test instructions are WDFs, the WDFs may be converted into a sequence of micro or system WDFs (SWDFs) that the processor 214 is capable of processing.

The decoding module 210 also may insert additional instructions into an output test instruction based on actions that may need to be performed by the processing module 214, but which were not specifically provided in the test instruction when the decoding module 210 received the test instruction. For example, the decoding module 210 may determine that for a test instruction intended to test a software application in an operating system, the software application and the operating system must first be loaded (i.e., loading the software application and the operating system are prerequisites to testing the software application). The decoding module 210 further determines the order in which these prerequisites are to be satisfied. For instance, the decoding module 210 may determine that the software application cannot be loaded until the operating system is loaded. Thus, the decoding module 210 may determine that the operating system is to be loaded first, followed by the software application. Based on this information, the decoding module 210 generates test instructions (a sequence of micro or system WDFs (i.e., SWDFs)) that instruct the processing module 214 as to precisely which actions are to be performed. When the test instructions are processed as described further below, the prerequisites are processed first, thereby satisfying any prerequisites and initializing the proper test environment. Once the prerequisites have been satisfied and/or the test environment has been initialized, testing may be performed.

In at least some embodiments, the decoding module 210 groups together multiple test instructions based on the target SUT 216 of each instruction. For example, some or all test instructions targeting a first SUT 216 may be classified into a first group. Some or all test instructions targeting a second SUT 216 may be classified into a second group. Some or all test instructions targeting a third SUT 216 may be classified into a third group, and so on. By grouping test instructions according to the target SUT 216 of each instruction, ATS 100 efficiency may be substantially greater than if the test instructions were not grouped by target SUT 216. The decoding module 210 subsequently may transfer the test instructions (or each group of test instructions) to the scheduling module 212 via connection 16. The test instructions may be transferred to the scheduling module 212 in groups, although the instructions also may be transferred to the scheduling module 212 individually or in any other suitable manner.

The scheduling module 212 schedules the test instructions such that ATS 100 performance (e.g., speed and efficiency) is positively affected. In some embodiments, the scheduling module 212 processes each group of test instructions as an independent execution sequence. In this way, the SUTs 216 are tested in parallel (e.g., simultaneously) and independent of each other. As such, the success or failure of an execution sequence on one SUT 216 may not affect the performance of an execution sequence on a different SUT 216. For this reason, independent, parallel execution sequences on different SUTs generally increase overall performance. Accordingly, the scheduling module 212 attempts to maximize the number of independent, parallel execution sequences. In at least some embodiments, in attempting to maximize the number of independent, parallel execution sequences, the scheduling module 212 may divide a single execution sequence into multiple, independent, parallel execution sequences, thus decreasing the amount of time necessary to process the execution sequences. The execution sequences then may be transferred to the processing module 214 via connection 18.

The processing module 214 receives and translates each execution sequence (i.e., group of test instructions) into a series of test commands that are subsequently transferred to a target SUT 216 via connection 20, which may be an Ethernet connection, a wireless connection or some other suitable communicative pathway. These commands, as previously explained, cause the target SUT 216 to perform various tasks and functions that facilitate the testing of one or more aspects of the target SUT 216. Minimal or no human intervention is required for the processing module 214 to test the target SUT 216. In this way, the SUT 216 is remotely and automatically tested by the processing module 214.

The target SUT 216 comprises at least one mechanism capable of receiving the commands and acting upon the commands. Mechanisms may operate independently or simultaneously. A mechanism may comprise, for example, an operating system or a test application, each of which is now discussed in turn. In at least some embodiments, the target SUT 216 comprises an operating system (e.g., WINDOWS®, LINUX®) that has multiple built-in commands that are responsive to the test commands received by the target SUT 216. For this reason, the commands generated by the processing module 214 may be operating-system-specific. For example, if an instruction is intended for a particular SUT 216 that is adapted to run the WINDOWS operating system, then the decoding module 210 translates the instruction into a command that can exploit the capabilities of the WINDOWS® operating system.

Examples of such commands include a "move file" command which, when transferred to the SUT 216, causes the SUT 216 to copy files from one folder to another on the SUT 216. Other instances include "run executable" commands which cause the SUT 216 to launch executable files stored on the SUT 216 or available through the WINDOWS® operating system on the SUT 216. Other commands may cause the SUT 216 to transfer test results to the processing module 214 or to reboot itself. Similar commands may be used for a SUT 216 that runs the LINUX® operating system or any other suitable operating system.

As previously mentioned, the mechanism also may comprise one or more test applications. Test applications perform the actual testing and analysis of the target SUT 216, whether the target SUT 216 is hardware or software. Test applications can be used to stress, validate or modify (i.e., test) various aspects of the target SUT 216. Test applications may reside on the target SUT 216 prior to testing or may be transferred from the tester 102 to the target SUT 216 via connection 20. Test applications are configured and run by commands received from the processing module 214. For example, to obtain an image ("screenshot") of the desktop of the SUT 216, a test application (adapted to capture such images) can be transferred to the SUT 216. The test application is then configured and executed using commands sent from the processing module 214, thus causing the test application to capture the image. The processing module 214 may further command the test application to transfer the image to the automation infrastructure 104.

In embodiments where a test application cannot be properly executed while residing on a target SUT 216, the test application can test the target SUT 216 without residing on the SUT 216. In such cases, the test application may reside on the automation infrastructure 104 (e.g., in the memory 204) and can be configured and executed by the processing module 214. For example, to time a reboot sequence of the target SUT 216, a test application capable of rebooting the target SUT 216 and timing the reboot sequence of the SUT 216 may be executed by the processing module 214, since the SUT 216 cannot execute software while the SUT 216 is switched off or while it is rebooting. Accordingly, commands may be sent to the target SUT 216, thus causing the SUT 216 to be rebooted and for the reboot sequence to be timed by the processing module 214.

As shown in FIG. 2, in at least some embodiments, the processing module 214 comprises a plurality of instruction-specific processing elements (ISPE) 215, where each ISPE 215 processes a different type of test instruction or execution sequence. Examples of ISPEs 215 comprise hardware configuration processing modules that set up and initialize hardware necessary for a test. Hardware necessary for a test may include, for example, basic input/output system read-only memory (BIOS ROM), non-volatile random access memory (NVRAM), network interface card (NIC) ROM, and/or any other hardware or firmware-based device. Other ISPEs 215 may comprise operation system load modules that initialize and load necessary operating systems, operating system configuration modules that initialize operating system settings, operating system revision modules that install and upgrade operating systems (e.g., service packs), test execution modules that perform remote SUT 216 tests and record results of the tests, and verification modules that verify the proper operation and successful environment initialization of SUTs 216.

As previously mentioned, the processing module 214 may process multiple execution sequences in parallel (i.e., simultaneously) and independent of each other. For example, the processing module 214 may send commands to a first SUT 216, causing the first SUT 216 to load an operating system. At substantially the same time, the processing module 214 may send commands to a second SUT 216, causing the second SUT 216 to begin executing a previously received test command. Similarly, at substantially the same time, the processing module 214 may monitor the performance of a third SUT 216 undergoing a test and may record the results of the test.

Such test results may indicate the success or failure of a test, an individual test command or an execution sequence. The data also may comprise information pertaining to the total test execution time, status of some or all of the SUTs 216, and/or any other relevant information. The processing module 214 may transfer the resultant data to memory 204 via connection 22 for storage. The processing module 214 also may provide the resultant data, organized in any format suitable for user inspection, to a display 206 via connection 24. In at least some embodiments, the display 206 may be part of a computer system having input devices (e.g., keyboard, mouse). The user may use these input devices to access previous test results or any other relevant information from the processing module 214 and/or the memory 204.

Figure 3:
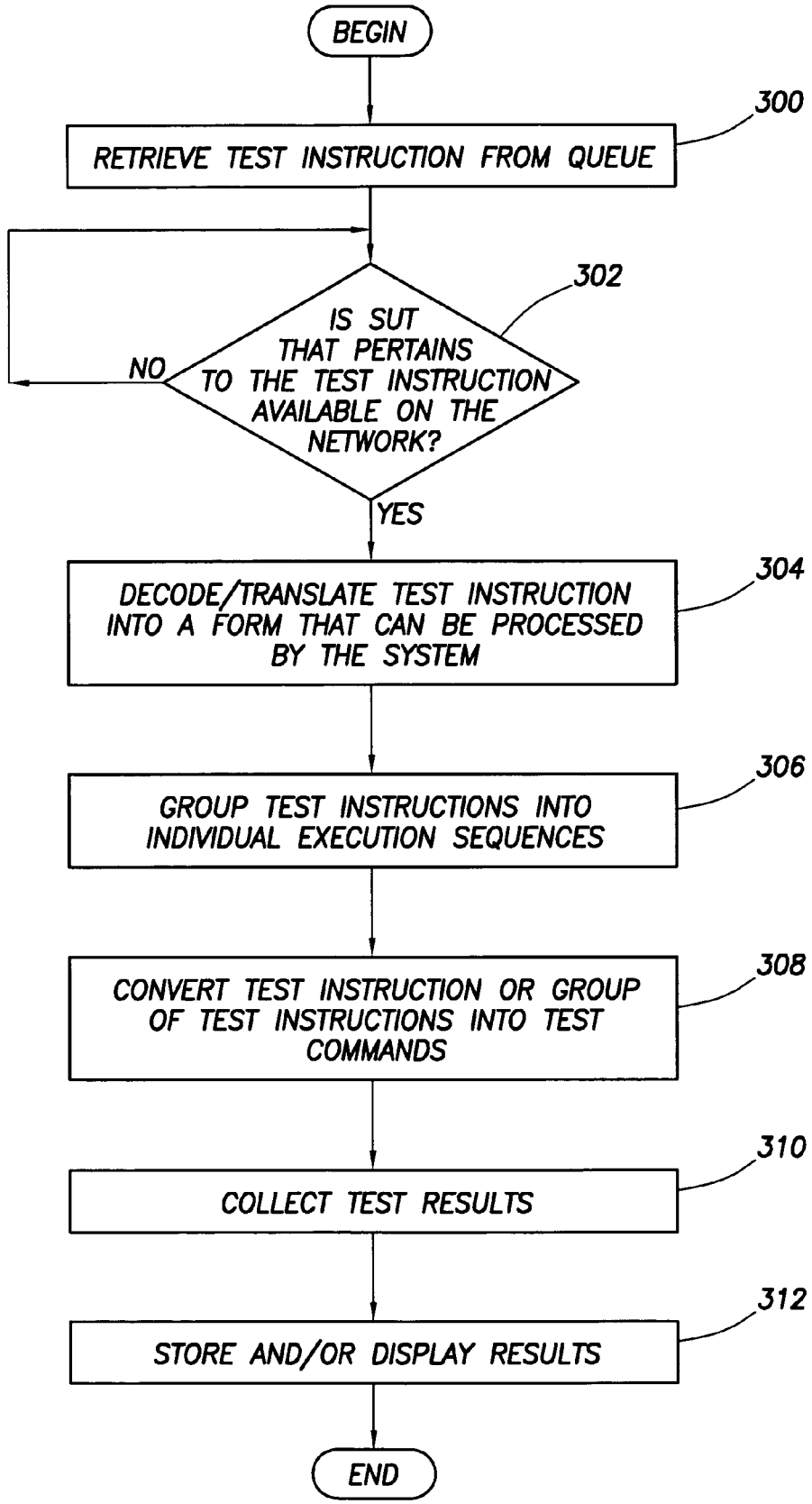
FIG. 3 shows a flow diagram of a method describing the operation of the ATS of FIGS. 1 and 2, in accordance with embodiments of the invention.

FIG. 3 shows a flow diagram of a method that may be used to implement the automatic testing system described above. Referring to FIGS. 2 and 3, the method may begin by retrieving a test instruction from an instruction queue 200 or other such storage module (block 300). The method continues by determining whether the SUT 216 targeted by the test instruction is available to be tested (block 302). If the targeted SUT 216 is unavailable, then the method may comprise monitoring the targeted SUT 216 until the targeted SUT 216 is available. However, if the targeted SUT 216 is available, then the method comprises decoding and translating the test instruction into a form that may be processed by the ATS 100 (block 304).

The method further comprises grouping the instructions based on the SUT 216 targeted by each instruction (block 306). The method also comprises using the processing module 214 to convert the instruction or group of instructions into a command or series of commands (block 308). As previously explained, the command(s) may trigger an operating system on the target SUT 216, a test application on the target SUT 216 or any other similar application on the target SUT 216 to perform the task(s) as directed by the command(s). The method then comprises collecting test results based on the outcomes of test(s) performed on the target SUT 216 (i.e., reaction of target SUT 216 to the test command(s)) (block 310) and storing and/or displaying the results (block 312).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a plurality of components; and
   an automation module coupled to the plurality of components;
   wherein the automation module is adapted to automatically initialize a software test environment for at least one of the plurality of components, wherein said software test environment prepares the at least one of the plurality of components to be tested;
   wherein the automation module is adapted to, without transferring a testing agent to said at least one of the plurality of components, automatically test said at least one of the plurality of components;
   wherein the automation module is capable of evaluating its workload and rejecting a test instruction input to the module based on the evaluation.

2. The system of claim 1, wherein the automation module tests, independently of each other, at least some of the plurality of components.

3. The system of claim 2, wherein the automation module simultaneously tests the at least some of the plurality of components.

4. The system of claim 1, wherein the automation module tests the at least one of the plurality of components by automatically transferring test commands to the at least one of the plurality of components.

5. The system of claim 1, wherein the automation module automatically groups a first test command with a second test command, each of the first and second test commands intended for a common component.

6. The system of claim 1, wherein the at least one of the plurality of components is physically separate from the automation module.

7. The system of claim 1, wherein the automation module is wirelessly coupled to at least some of the plurality of components.

8. The system of claim 1, wherein the automation module determines the availability of a component for testing.

9. A testing apparatus, comprising:
   an accepting module configured to evaluate a workload of the testing apparatus and reject a test instruction input to the module based on the evaluation;
   a scheduling module adapted to automatically partition test instructions into groups; and
   a processing module coupled to said scheduling module and adapted to automatically convert at least some of the groups of test instructions into groups of test commands, said test commands capable of being processed by a remote system under test (SUT) external to the testing apparatus;
   wherein the processing module automatically tests the remote SUT using a group of test commands provided to the SUT and without transferring a testing agent to the remote SUT, said remote SUT being one of a plurality of SUTs;
   wherein the testing apparatus is adapted to automatically modify a test instruction based on a testing environment needed to use the test instruction.

10. The testing apparatus of claim 9, wherein the testing apparatus is adapted to simultaneously test at least some of the plurality of SUTs, the SUTs coupled to the testing apparatus via a network.

11. The testing apparatus of claim 10, wherein at least some of the SUTs are tested independently of each other.

12. The testing apparatus of claim 9, wherein the processing module automatically tests the remote SUT using the group of test commands to configure and execute a test application, said test application adapted to stress the remote SUT and located on one of the remote SUT or the processing module.

13. The testing apparatus of claim 9, wherein the processing module automatically initializes a testing environment on the remote SUT.

14. The testing apparatus of claim 9 further comprising an accepting module adapted to store a test instruction intended for the remote SUT until the remote SUT is available.

15. The apparatus of claim 9, further comprising:
   a decoding module that translates a given test instruction received from an instruction queue into a format suitable for processing by the processing module, and provides additional test instructions to the processing module based on and not provided for by the given test instruction.

16. A method, comprising:
   partitioning a plurality of, test instructions into groups based on identification in each of the test instructions of a remote system to be tested using the instruction, each group testing a disjoint set of remote systems;
   converting at least some of the groups of test instructions into groups of test commands capable of being processed by corresponding remote systems; and
   without transferring a testing agent to any of the remote systems, simultaneously testing at least some of the remote systems by transferring at least some of the groups of test commands to the at least some of the remote systems.

17. The method of claim 16, wherein simultaneously testing the at least some of the remote systems comprises testing the at least some of the remote systems independently of each other.

18. The method of claim 16, wherein testing the at least some of the remote systems comprises at least one of configuring and executing test applications using the test commands, said test applications stored on the at least some of the remote systems and adapted to stress the at least some of the remote systems.

19. The method of claim 16 further comprising automatically storing test instructions in a queue and processing the test instructions provided from the queue when a pertinent, remote system is available, wherein the processing comprises the partitioning, the converting, and the transferring.

20. The method of claim 16 further comprising determining whether one of the remote systems is available for testing.

21. A system, comprising:

means for partitioning a plurality of test instructions into groups based on identification in each of the test instructions of a remote system to be tested using the instruction, each group testing a disjoint set of remote systems, wherein remote systems are unable to execute the test instructions;

means for converting at least some of the groups of test instructions into groups of test commands capable of being executed by corresponding remote systems; and means for simultaneously testing, without transferring a testing agent to any of the remote systems, at least some of the remote systems by transferring at least some of the groups of test commands to the at least some of the remote systems.

22. The system of claim 21 further comprising means for determining whether one of the remote systems is available for testing.

\* \* \* \* \*

UNITED STATES PATENT AND TRADEMARK OFFICE
CERTIFICATE OF CORRECTION

PATENT NO. : 7,921,345 B2
APPLICATION NO. : 11/132569
DATED : April 5, 2011
INVENTOR(S) : Craig R. Trump et al.

It is certified that error appears in the above-identified patent and that said Letters Patent is hereby corrected as shown below:

In column 8, line 49, in Claim 16, delete "of," and insert -- of --, therefor.

Signed and Sealed this
Thirteenth Day of September, 2011

David J. Kappos
*Director of the United States Patent and Trademark Office*